(12) United States Patent
Lampenscherf (10) Patent No.: US 7,556,851 B2
(45) Date of Patent: Jul. 7, 2009

(54) COATED COMPONENT AND PRODUCTION PROCESS

(75) Inventor: Stefan Lampenscherf, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 555 days.

(21) Appl. No.: 11/330,577

(22) Filed: Jan. 12, 2006

(65) Prior Publication Data

US 2006/0159939 A1    Jul. 20, 2006

(30) Foreign Application Priority Data

Jan. 14, 2005    (EP) .................................. 05000728

(51) Int. Cl.
*B32B 15/04* (2006.01)
*B32B 3/10* (2006.01)

(52) U.S. Cl. ................ 428/134; 428/133; 428/136; 428/138; 428/704; 428/632; 428/655; 428/656; 428/469; 428/702; 428/690

(58) Field of Classification Search ........................ None
See application file for complete search history.

(56) References Cited

U.S. PATENT DOCUMENTS

| 5,213,712 | A | * | 5/1993 | Dole ................ 252/301.4 R |
| 5,849,416 | A | | 12/1998 | Coffinberry et al. |
| 6,024,792 | A | | 2/2000 | Kurz et al. |

FOREIGN PATENT DOCUMENTS

| EP | 0 412 397 A1 | 2/1991 |
| EP | 0 486 489 B1 | 5/1992 |
| EP | 0 786 017 B1 | 7/1997 |
| EP | 0 892 090 A1 | 1/1999 |
| EP | 1 105 550 B1 | 6/2001 |

(Continued)

OTHER PUBLICATIONS

J.I. Eldridge, T.J. Bencic, S.W. Allison, D.L. Beshears; "Depth-Penetrating Temperature Measurements of Thermal Barrier Coatings Incorporating Thermographic Phosphors"; The Institution of Electrical Engineers; Journal of Thermal Spray Technology; Mar. 2004; One Page; XP-002333322; No. 8099253; ASM Int., USA.

*Primary Examiner*—Ling Xu (57) ABSTRACT

The invention relates to a coated turbine component adapted for exposure to a hot gas flow, comprising a component body comprising a base material, a thermal barrier coating applied to the base material, and a thermographic phosphor arranged within, on or beneath the thermal barrier coating surface adapted to emit light corresponding to a temperature of the thermographic phosphor. The invention also relates to a method for producing a coated turbine component comprising applying a first thermal barrier coating containing an activator to a component body base material, the activator providing the thermal barrier layer coating with thermographic properties such that light is emitted corresponding to a temperature of the thermographic phosphor, applying a second thermal barrier coating that does not contain the activator on top of the first thermal barrier coating, and removing a portion of the second thermal barrier coating to expose the thermographic phosphor layer underlying the second thermal barrier coating. The invention also relates to a method for producing a coated turbine component comprising applying a thermal barrier coating to a component body, trenching the thermal barrier coating to form a base at the bottom of the trench and applying a thermographic phosphor to the base of the trench.

16 Claims, 8 Drawing Sheets

FOREIGN PATENT DOCUMENTS

| EP | 1 204 776 B1 | 5/2002 |
| EP | 1 306 454 A1 | 5/2003 |
| EP | 1 319 729 A1 | 6/2003 |
| WO | WO 99/67435 | 12/1999 |
| WO | WO 00/06796 | 2/2000 |
| WO | WO 00/44949 | 8/2000 |
| WO | WO 2005/019784 A1 | 3/2005 |

* cited by examiner

COATED COMPONENT AND PRODUCTION PROCESS

CROSS REFERENCE TO RELATED APPLICATIONS

This application claims the benefits of European Patent application No. EP05000728.5 filed Jan. 14, 2005, all of the applications are incorporated by reference herein in their entirety

FIELD OF THE INVENTION

The present invention relates to a coated component, which comprises a component body made from a base material and a thermal barrier coating applied to the base material, and to processes for producing this component.

BACKGROUND OF THE INVENTION

Increasing efficiency plays a central role on the road to generating energy while preserving resources and safeguarding the environment. For example, by 2025 it is aimed to increase the overall efficiency of combined-cycle power plants (a combination of gas turbine power plant and steam turbine power plant) to over 60%. To enable this objective to be achieved, it is necessary to increase the efficiency of gas turbines.

An important parameter in increasing the efficiency of gas turbines is the turbine inlet temperature. The current efficiency of a gas turbine of approx. 38% can be achieved with a turbine inlet temperature of 1230° C. (ISO). Increasing the efficiency of the gas turbine would require an increase in the turbine inlet temperature. For example, in order to increase the efficiency of a gas turbine to 45%, it would be necessary to increase the turbine inlet temperature to approx. 1350° C.

In addition to the use of improved base materials and effective cooling methods, the use of ceramic thermal barrier coatings constitutes a key technology for achieving this objective. On account of the thermally insulating action of the ceramic thermal barrier coating, the surface of the coated component can be exposed to a temperature which is several 100° C higher than without the thermal barrier coating, without the cooling conditions for the component having to be altered. A precondition for the efficient use of ceramic thermal barrier coatings (referred to below as TBCs) in gas turbines, in addition to an inexpensive process technology, is in particular the structural stability and therefore the reliability of the TBC under the conditions of use in gas turbines. For example, for gas turbines used in power plant applications, faultless functioning for over 20000 equivalent operating hours, as they are known, or more has to be ensured. Premature failure of the TBC would consequently lead to the base material of the coated turbine components overheating and possibly to catastrophic damage to the turbine. The operating loss and maintenance costs caused by turbine damage may be considerable and would ultimately cancel out the technological benefit of the TBC.

In future generations of high-efficiency gas turbines, the stresses will move closer and closer to the limits of the TBC's abilities. To ensure that the risk of failure is not uncontrollably increased as a result, the stress parameters which are critical for failure of the TBC have to be measured and checked in operation. Important stressing parameters in this context are the surface temperature of the TBC at critical component positions, known as hot spots, and the time dependency of the surface temperature. The latter is important in particular for the transitions between different operating states of the gas turbine, for example when running up the gas turbine.

Therefore, there is a demand for a suitable sensor element which is suitable for measuring temperature and heat flux in the TBC under operating conditions of a gas turbine.

Pyrometers and thermal imaging cameras are nowadays already in use for measuring the surface temperature of guide vanes in gas turbines. In this case, the radiation emitted by the TBC surface in a defined wavelength region, for example in the infrared or near infrared, is detected and, taking account of the emissivity and the detector sensitivity, converted into an equivalent surface temperature of the TBC. In this context, the generally inadequate knowledge of the wavelength-dependent emissivity of the TBC surface, which may be sensitively influenced inter alia by deposits on the TBC surface (for example rust), presents difficulties.

Another way of measuring surface temperatures is to use thermographic phosphors. A thermal barrier coating with embedded thermoluminescence indicator material and methods for determining the temperature of the thermal barrier coating are described, for example, in EP 1 105 550 B1. To determine the temperature of the thermal barrier coating, the indicator material is excited to fluoresce by means of a pulsed laser. After the excitation pulse has been switched off, the intensity of the fluorescence spectrum drops exponentially with a characteristic time constant t. For example, terbium-doped yttrium aluminum garnet (YAG:Tb) has a monotone decrease in the characteristic time constant t between 700 and 1000° C. The temperature of the indicator material and therefore of the thermal barrier coating in which it is embedded can be ascertained by measuring the time constant, provided appropriate calibration has been carried out. Under certain circumstances, different lines of the emission spectrum may have different decay constants, which may also have different temperature dependencies.

Instead of the time decay properties of the emission intensity of the indicator material, it is also possible to use the intensity ratio of two emission wavelengths to determine the temperature of the indicator material and therefore the temperature of the thermal barrier coating. The intensity ratio is approximately linearly dependent on the temperature of the indicator material, i.e. on the temperature of the thermal barrier coating in which the indicator material is embedded. The measuring of the temperature by means of the intensity ratio is likewise described in EP 1 105 550 B1.

The advantage of using measurement methods which are based on thermographic phosphors is that they are independent of the emissivity of the TBC, which is generally only inadequately known, and of the influence of surface contamination, which often influences the property of the TBC as a heat radiator. The specific properties of the emission spectrum of the phosphor, by contrast, are only slightly influenced by the emissivity and surface contamination.

The restriction on the thermal sensitivity of the phosphors to in each case a specific temperature range and the limited long-term stability of a thermographic phosphor under the thermal and atmospheric conditions of a gas turbine impose limits on temperature measurement by means of emission spectra of thermographic phosphors.

SUMMARY OF THE INVENTION

In light of the prior art described, it is an object of the present invention to provide a coated component and a corresponding process which are particularly suitable for temperature measurement under the thermal and atmospheric conditions of a gas turbine.

This object is achieved by the coated component as described in the claims. The dependent claims include advantageous configurations of the invention which can be combined in any desired way.

A coated component according to the invention, which is designed as a component of a structure which routes hot gases, for example a gas turbine, comprises a component body made from a base material and a thermal barrier coating (TBC) applied to the base material. In this case, the thermal barrier coating may either be applied directly to the base material or there may be what is known as a bond coat in between. Moreover, the thermal barrier coating may be formed as either a single layer or as a multiple layer. Moreover, the thermal barrier coating contains a thermographic phosphor. According to the invention, the thermal barrier coating includes at least one recess. The thermographic phosphor is arranged in the base region of the recess. Each recess has a depth and width which are selected in such a manner that its base is protected from being directly attacked by the hot gas. The dimensions of the recess which are required to achieve this effect depend in particular on the temperature of the hot gas, the position of the recess on the component and the flow conditions in the structure which routes hot gas. Suitable depths and widths for the recesses are to be determined empirically in a suitable way.

Arranging the thermographic phosphor in a recess in the thermal barrier coating offers the possibility of protecting the phosphor from being directly attacked by a hot gas, and therefore of protecting it from the corrosive and abrasive action of this hot gas when the coated component is used in a region of a gas turbine which routes hot gas.

Moreover, arranging the thermographic phosphor in the base region of the recess offers the advantage that the surface temperatures at the surface of the thermal barrier coating may also be above the range which is optimum for the thermographic phosphor. Another advantage is that the aging of the phosphor is not directly dependent on the surface temperature of the thermal barrier coating. There are also no problems caused by lack of transparency of the thermal barrier coating for the emission wavelengths of the phosphor, since there is no thermal barrier coating above the phosphor arranged at the base region.

If the component has at least two recesses of different depths, in the base region of which thermographic phosphors with different illumination properties are present, it is possible to measure the heat flux from the coating surface toward the base material.

The thermographic phosphor may in particular be selected in such a way that itself likewise has thermal barrier properties.

In one configuration of the coated component according to the invention, the thermographic phosphor is arranged in the interior of the thermal barrier coating. The at least one recess is then formed in such a manner that the thermographic phosphor in the region of the recess is uncovered by the latter. This can be achieved in particular by the coating having at least two layers applied above one another. In this case, at least the outermost layer has thermal barrier properties. Thermographic phosphor is arranged in a layer covered at least by the outermost layer, and the at least one recess extends through the layers arranged above a phosphor layer. This configuration offers the option of applying one or more layers containing thermographic phosphor to the component over a large area. Masks as are used for the local application of thermographic phosphors are not required. Moreover, this configuration simultaneously offers the option of determining the wear to the layers located above the layer containing phosphor when the component is operating on the basis of thermographic phosphor being uncovered at locations at which a recess should not be present. Moreover, the production of multilayer coatings can easily be incorporated in existing processes.

However, as an alternative to producing multilayer coatings, it is also possible for a coating to be doped with a thermographic phosphor. In this context, the term doping is to be understood as meaning the introduction of foreign substances into a coating material. In this context, the term foreign substances is to be understood as meaning substances which are not contained in the actual material composition of the coating itself.

In a coated component according to the invention, the thermographic phosphor can be present in the form of at least one doping which has been introduced into the thermal barrier coating at least in the region of a recess. In particular, each doping can form a doped zone which extends through the entire thermal barrier coating at a certain distance from the coating surface. The depth of the at least one recess is then selected in such a manner that a doped zone is uncovered in the region of the recess. In this configuration, large-area doping of the component can be used. There is therefore no need for masks for the doping. Moreover, it is possible to use a doped zone arranged at a certain distance from the coating surface as an indication of wear.

However, it is also possible for the doping to be only locally introduced into the thermal barrier coating, for example using masks. By way of example, it is thus possible to provide a coated component in which a doping is present only in the base region of the at least one recess. Local doping is of interest in particular if the introduction of the dopant influences the thermal properties of the thermal barrier coating. Influencing of this nature can generally be minimized by introducing only a small percentage of dopant into the coating. However, a small percentage of dopant also means that the emission of the phosphor has only a relatively low intensity. Therefore, a certain minimum quantity of dopant is required in order to allow reliable measurement of the temperature of the thermal barrier coating. If this minimum concentration or the desired concentration has an adverse effect on the thermal properties of the thermal barrier coating, large-area doping would not be appropriate. If the dopant is only locally arranged, however, it may be possible to accept a local deterioration in the thermal properties, in particular if the doped region of the coating is protected from direct attack from the hot gas by virtue of its position in a recess.

However, just a local arrangement of the thermographic phosphor can also be achieved instead of by doping by the fact that it is present as a phosphor coating applied to the base of the recess.

In the coated component according to the invention, the recess may in particular be configured in the form of a trench. Trench-like structures have an advantageous effect on the stability of thermal barrier coatings, which proves advantageous in particular during transitions between different operating states, with the associated thermal stresses. Accordingly, trench structures are in particular arranged in a targeted way in highly thermally stressed regions of the thermal barrier coating. In particular there, however, information about the temperature and heat flux within the thermal barrier coating is particularly important in order to detect overloading in good time and to prevent failure of the thermal barrier coating. Moreover, arranging thermographic phosphors in the base region of the trench structures allows a temperature and heat flux sensor which is integrated in the thermal barrier coating to be realized without causing considerable additional costs in production or altering the structural stability of the thermal barrier coating. The trench structures described can be produced by means of laser with a high degree of accuracy at various positions of the component, in particular including in curved regions.

In the coated component according to the invention, at least one metal oxide comprising at least one trivalent metal may be present as thermographic phosphor. By way of example, the metal oxide may be a perovskite with the empirical formula AA'O$_3$ or a pyrochlore with the empirical formula A$_2$B$_2$0$_7$, where A and A' represent a trivalent metal and B represents a tetravalent metal. In a further configuration, A or A' may in particular represent a rare earth element (also known as lanthanides) or rhenium (Re), and the other may in each case represent at least one of the following elements: lanthanum, gadolinium, samarium.

In the component according to the invention, the thermographic phosphor may be a phosphor whose ability to light up is based on an activator which comprises at least one rare earth element. As rare earth element, it may in particular comprise at least one of the following elements: cerium (Ce), europium (Eu), dysprosium (Dy), terbium (Th).

The coated component according to the invention is particularly suitable for use in gas turbines. Accordingly, it may be designed as a turbine component, for example as a rotor blade or guide vane of a gas turbine installation.

BRIEF DESCRIPTION OF THE DRAWINGS

Further features, properties and advantages of the present invention will emerge from the following description of exemplary embodiments with reference to the appended figures. In the drawing.

DETAILED DESCRIPTION OF THE INVENTION

Figure 1:
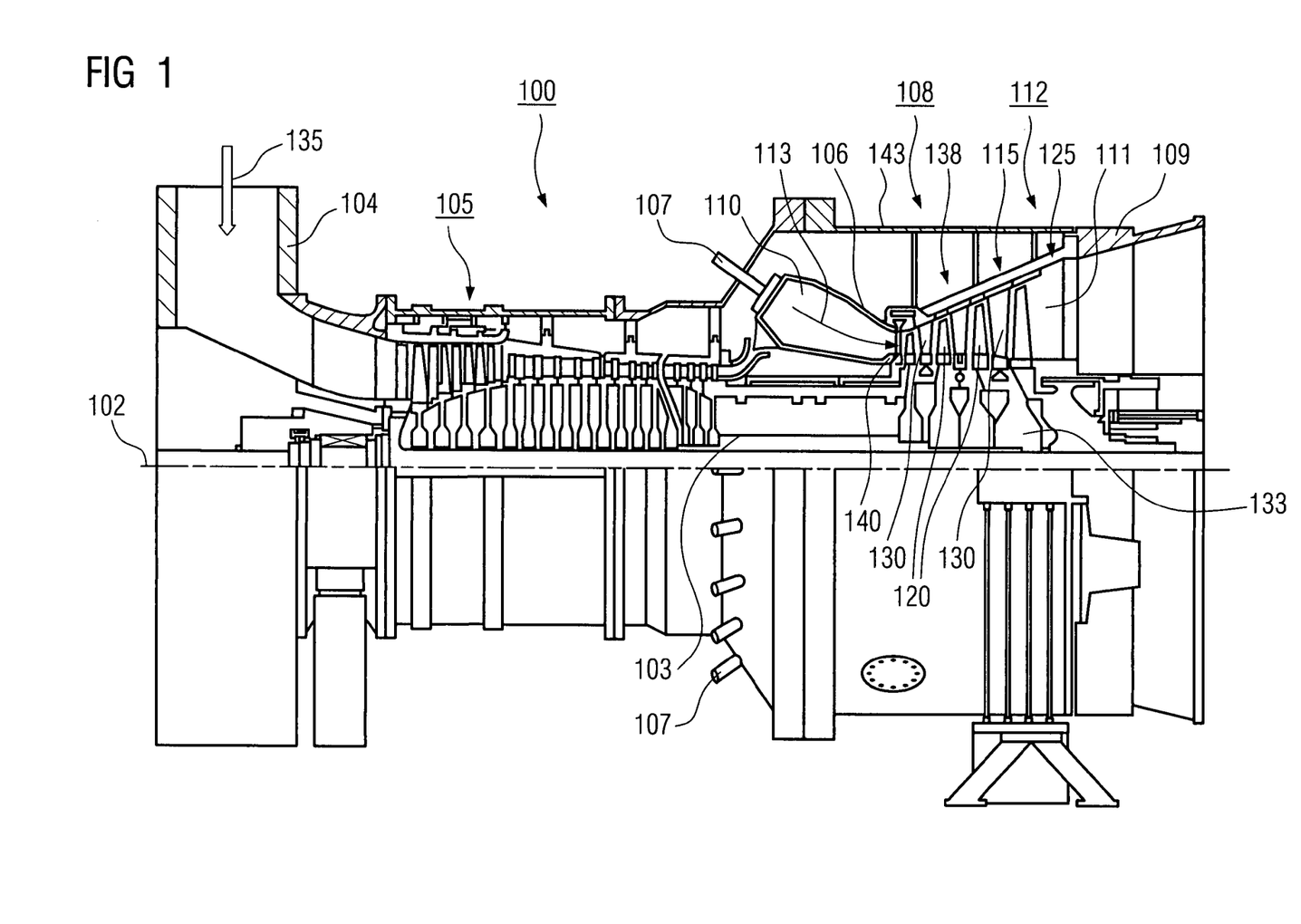
FIG. 1 shows by way of example a partial longitudinal section through a gas turbine.

FIG. 1 shows by way of example a partial longitudinal section through a gas turbine 100. In its interior, the gas turbine 100 has a rotor 103 which is mounted such that it can rotate about an axis of rotation 102 and is also referred to as the turbine rotor. An intake casing 104, a compressor 105, a for example toric combustion chamber 110, in particular an annular combustion chamber 106, with a plurality of coaxially arranged burners 107, a turbine 108 and an exhaust gas casing 109 follow one another along the rotor 103.

The annular combustion chamber 106 is in communication with a for example annular hot gas duct 111. There, by way of example four successive turbine stages 112 form the turbine 108.

Each turbine stage 112 is formed, for example, from two blade rings. As seen in the direction of flow of a working medium 113, a guide vane row 115 is followed in the hot gas duct 111 by a row 125 formed from rotor blades 120.

The guide vanes 130 are secured to an inner casing 138 of a stator 143, whereas the rotor blades 120 belonging to a row 125 are arranged on the rotor 103, for example by means of a rotor disk 133.

A generator (not shown) is coupled to the rotor 103.

While the gas turbine 100 is operating, air 135 is drawn in through the intake casing 104 and compressed by the compressor 105. The compressed air provided at the turbine end of the compressor is passed to the burners 107, where it is mixed with a fuel. The mixture is then burnt in the combustion chamber 110, forming a working medium 113. From there, the working medium 113 flows along the hot gas duct 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 106, are subject to the highest thermal stresses.

To be able to withstand the temperatures which prevail there, they can be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110. Superalloys of this type are known, for example, from EP 1 204 776 B1, EP 1 306 454, EP 1 319 729 A1, WO 99/67435. or WO 00/44949; these documents form part of the disclosure.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon and/or at least one rare earth element or hafnium). Alloys of this type are known from EP0 486 489 B1, EP 0 786 017 B1, EP 0 412 397 B1 or EP 1 306 454 A1, which are intended to form part of the present disclosure.

A thermal barrier coating, consisting for example of ZrO$_2$, Y$_2$O$_3$—ZrO$_2$, i.e. unstabilized, partially stabilized or completely stabilized by yttrium oxide and/or calcium oxide and/or magnesium oxide, may also be present on the MCrAlX.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 2:
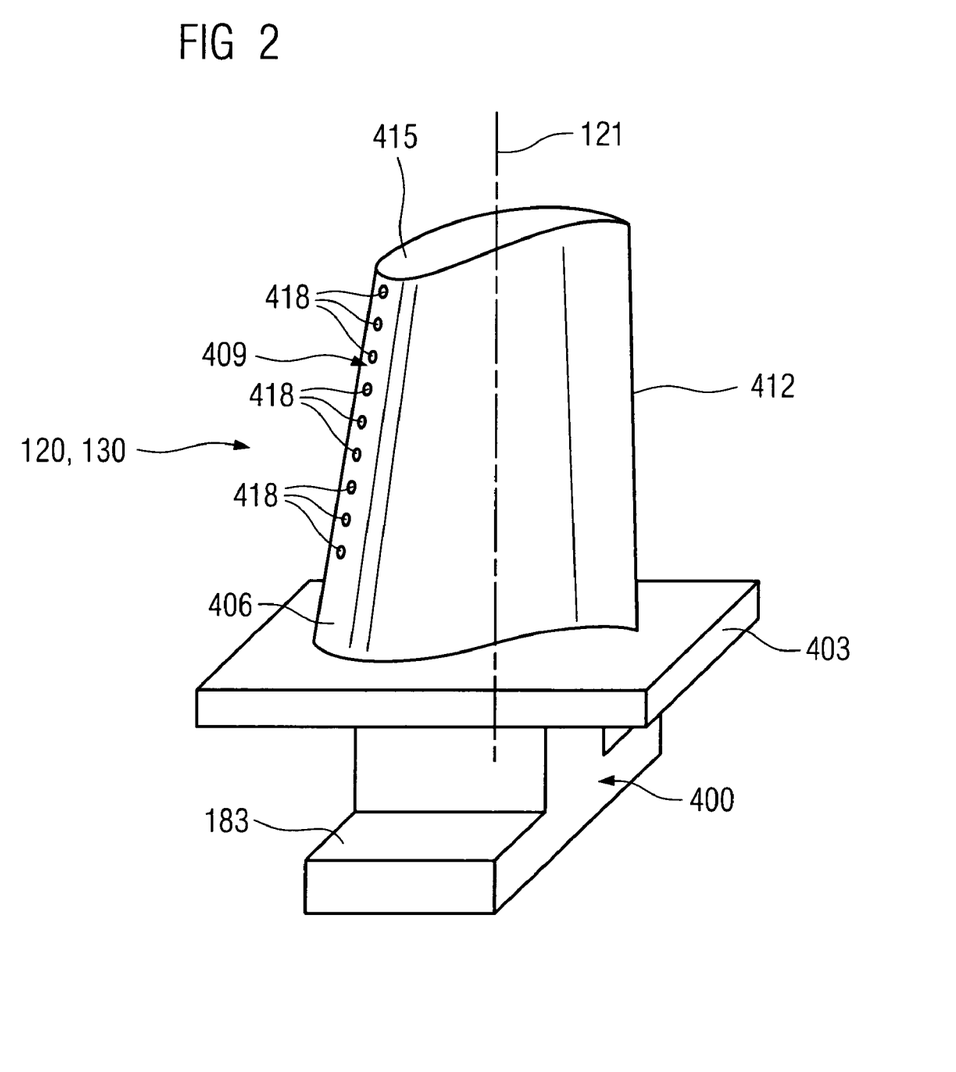
FIG. 2 shows a perspective view of a rotor blade or guide vane of a gas turbine.

FIG. 2 shows a perspective view of a rotor blade 120 or guide vane 130 of a turbine machine which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406. As a guide vane 130, the vane 130 may have a further platform (not shown) at its vane tip 415.

A blade or vane root 183, which is used to secure the rotor blades 120, 130 to a shaft or disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade 120, 130. Superalloys of this type are known, for example, from EP 1 204 776 B1, EP 1 306 454, EP 1 319 729 A1, WO 99/67435 or WO 00/44949; these documents form part of the disclosure. The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses. Single-crystal workpieces of this type are produced, for example, by directional solidification from the melt. This involves casting processes in which the liquid metallic alloy solidifies to form the single-crystal structure, i.e. the single-crystal workpiece, or solidifies directionally. In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to the globular (polycrystalline) solidification needs to be avoided, since non-directional growth inevitably forms transverse and longitudinal grain boundaries, which negate the favorable properties of the directionally solidified or single-crystal components. Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures). Processes of this type are known from U.S. Pat. No. 6,024,792 and EP 0 892 090 A1; these documents form part of the disclosure.

The blades or vanes 120, 130 may likewise have coatings protecting against corrosion or oxidation (MCrAlX; M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure.

It is also possible for there to be a thermal barrier coating, consisting for example of $ZrO_2$, $Y_2O_3$—$ZrO_2$, i.e. unstabilized, partially stabilized or completely stabilized by yttrium oxide and/or calcium oxide and/or magnesium oxide, on the MCrAlX. Columnar grains are produced in the thermal barrier coating by means of suitable coating processes, such as for example electron beam physical vapor deposition (EB-PVD).

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 3:
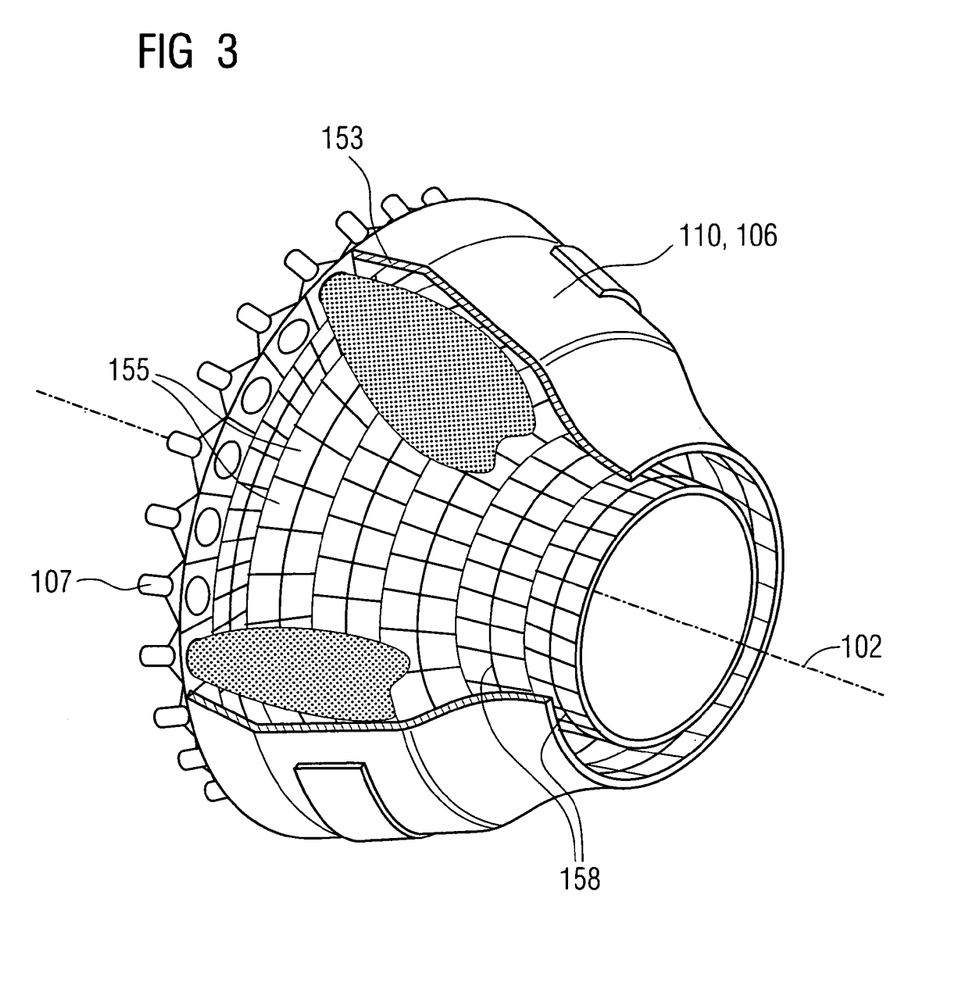
FIG. 3 shows the combustion chamber of a gas turbine.

FIG. 3 shows a combustion chamber 110 of a gas turbine. The combustion chamber 110 is configured, for example, as what is known as an annular combustion chamber, in which a multiplicity of burners 107 arranged circumferentially around the axis of rotation 102 open out into a common combustion chamber space. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heatshield elements 155.

On the working medium side, each heatshield element 155 is equipped with a particularly heat-resistant protective layer or is made from material that is able to withstand high temperatures. These may be solid ceramic bricks or alloys with MCrAlX and/or ceramic coatings. The materials of the combustion chamber wall and their coatings may be similar to the turbine blades or vanes.

A cooling system may also be provided for the heatshield elements 155 and/or their holding elements, on account of the high temperatures in the interior of the combustion chamber 110.

The combustion chamber 110 is designed in particular to detect losses from the heatshield elements 155. For this purpose, a number of temperature sensors 158 are positioned between the combustion chamber wall 153 and the heatshield elements 155.

Figure 4:
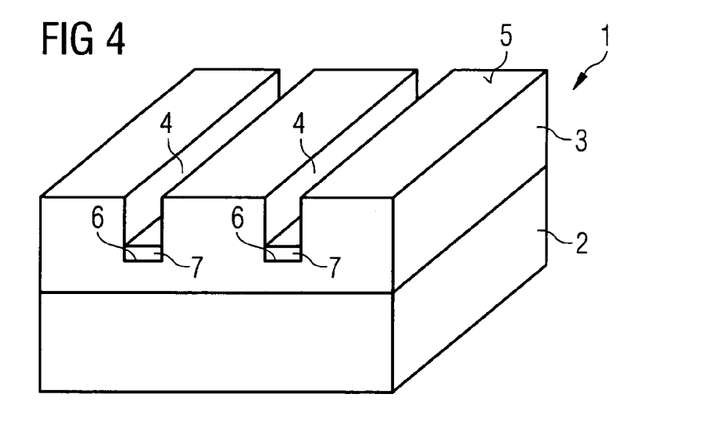
FIG. 4 shows a highly diagrammatic illustration of a first exemplary embodiment of a component according to the invention.

A first exemplary embodiment of a coated component according to the invention is illustrated in FIG. 4.

The component 1, which is illustrated in highly diagrammatic form, is intended to be a turbine component 120, 130, 155. The turbine component 1 is made from a base material 2, to which a thermal barrier coating 3 has been applied. If appropriate, a bond coat may also be present between the thermal barrier coating 3 and the base material 2.

When the turbine component 1, 120, 130, 155 is installed in a gas turbine installation, the thermal barrier coating 3 faces the region of the gas turbine installation which routes hot gas. The coating 3 ensures reduced heat exchange between the hot gas and the generally metallic base material of the turbine component 1. In other words, the thermal barrier coating counteracts the flow of temperature in the direction of the base material 2.

In particular superalloys based on nickel (Ni) or cobalt (Co) are suitable as base material 2 for the turbine component 1.

Recesses, for example in the form of trenches 4, are present in the thermal barrier coating 3, extending from the surface 5 of the coating 3 into the coating 3 in the direction of the base material 2, without reaching the base material 2. Therefore, the base material 2 is covered by the thermal barrier coating 3 even in the region of the trenches 4, but the thermal barrier coating 3 is less thick in the region of the trenches 4 than outside the trenches 4.

A thermographic phosphor 7 has been applied to the base 6 of the trenches 4. On irradiation with a suitable wavelength, this thermographic phosphor produces luminescence light, which can be detected using a suitable detector. Even if the thermal barrier coating 3 does not transmit the detected wavelength of the luminescence light, detection is nevertheless possible, since the trenches 4 allow the luminescence light to emerge from the thermographic phospor 7 into a defined spatial angle region without being impeded. The detector merely has to be arranged in this spatial angle region in order to be able to detect the luminescence light.

The text which follows gives examples of the material composition of the thermal barrier coating and of the thermographic phosphor 7:

EXAMPLE 1

The thermal barrier coating 3 is made from a metal oxide in the form of a rare earth aluminate with the empirical formula $Gd_{0.25}La_{0.75}AlO_3$. The thermographic phosphor is likewise made from a metal oxide in the form of a rare earth aluminate with the empirical formula $Gd_{0.25}La_{0.75}AlO_3$. Unlike the material of the thermal barrier coating 3, however, the material of the thermographic phosphor 7 is mixed with one mol % of europium oxide ($Eu_2O_3$), with the europium functioning as an activator for the phosphor. When the thermographic phosphor 7 is excited with a wavelength of 254 nm, it-emits luminescence light with an emission maximum at approximately 610 nm. Alternatively, the activator used may also be one mol % of terbium (Tb). In this case, the thermographic phosphor 7 emits luminescence light with an emission maximum at approx. 544 nm. Other activators are possible.

EXAMPLE 2

The thermal barrier coating 3 is made from a pyrochlore. The pyrochlore is in particular a gadolinium zirconate with the empirical formula $Gd_2Zr_2O_7$. The thermographic phosphor 7 is likewise made from this pyrochlore. Unlike the thermal barrier coating 3, however, it is mixed with one mol % of europium oxide, the europium serving as an activator for the phosphor. Other activators are possible.

EXAMPLE 3

The thermal barrier coating 3 is made from a zirconium oxide ($ZrO_2$) stabilised with yttrium (Y). The thermographic phosphor 7 is likewise made from an yttrium-stabilized zirconium oxide, but the phosphor, unlike the thermal barrier coating 3, is mixed with one mol % of $Eu_2O_3$, the europium serving as an activator for the phosphor.

Figure 5:
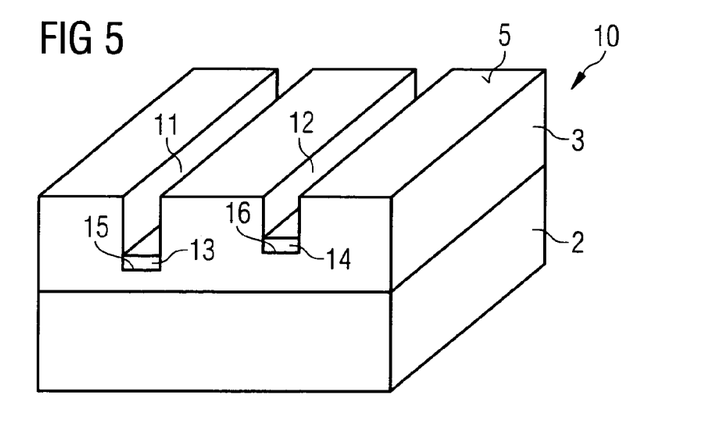
FIG. 5 shows a highly diagrammatic illustration of a second exemplary embodiment of a coated component according to the invention.

As a second exemplary embodiment of a coated component according to the invention, FIG. 5 shows a highly diagrammatic illustration of a turbine component 10.

The turbine component 10 differs from the turbine component 1 only by virtue of the fact that trenches 11, 12 with different depths are present. The depths of the two trenches are in each case selected in such a way that none of the trenches reaches the base material 2 of the component. Moreover, different thermographic phosphors 13, 14 are present in the region of the trench bases 15, 16. The statements which have been made in Examples 1 to 3 apply analogously to the material composition of the thermal barrier coating and of the thermographic phosphors. However, it should be noted that the thermographic phosphor 13 may differ from the thermographic phosphor 14.

By way of example, the phosphor regions 13 and 14 may each be made from a metal oxide in the form of a rare earth aluminate with the empirical formula $Gd_{0.25}La_{0.75}AlO_3$, the metal oxide of the thermographic phosphor 13 being mixed with one mol % of $Eu_2O_3$, whereas the metal oxide of the thermographic phosphor 14 is mixed with one mol % of Th. When the two thermographic phosphors 13, 14 are excited with laser light, two different emission wavelengths are then obtained, from which the temperature at the respective depth of the thermal barrier coating 3 can be determined.

Figure 6:
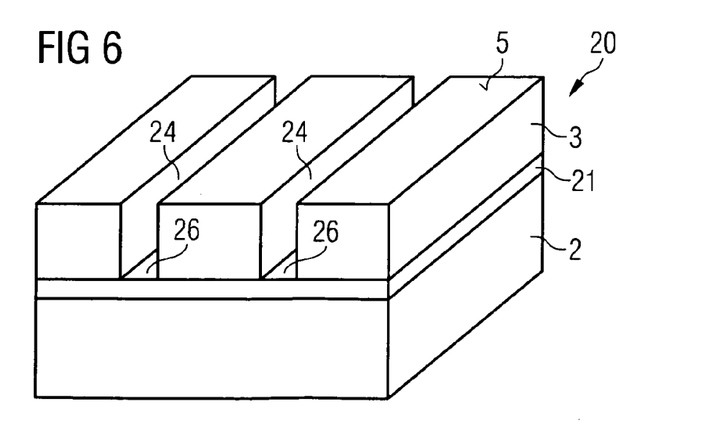
FIG. 6 shows a highly diagrammatic illustration of a third exemplary embodiment of a coated component according to the invention.

As a third exemplary embodiment of a coated component according to the invention, FIG. 6 shows a highly diagrammatic illustration of a turbine component 20.

The turbine component 20 comprises a base material 2 and a thermal barrier coating 3, to the properties of which the statements which have been made in connection with the first exemplary embodiment apply analogously. A further coating 21, which likewise has thermal barrier properties, is arranged between the thermal barrier coating 3 and the base material 2 of the turbine component 20. In particular, the coating 21 in the third exemplary embodiment is made from substantially the same material as the thermal barrier coating 3, except that the material of the coating 21 is mixed with an activator, for example Th. Other activators are possible.

Recesses, for example in the form of trenches 24, have been introduced into the thermal barrier coating 3, extending as far as the coating 21 and uncovering the latter.

Figure 7:
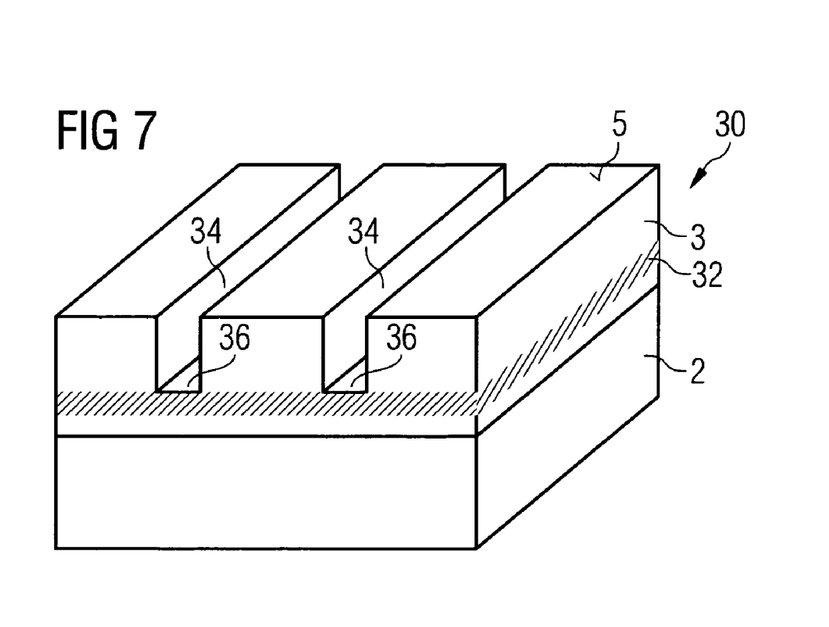
FIG. 7 shows a highly diagrammatic illustration of a fourth exemplary embodiment of a coated component according to the invention.

As a fourth exemplary embodiment of a coated component according to the invention, FIG. 7 shows a highly diagrammatic illustration of a turbine component 30.

The turbine component 30 comprises a base material 2 and a thermal barrier coating 3, which substantially correspond to the base material 2 and the thermal barrier coating in the first exemplary embodiment. Unlike in the first exemplary embodiment, however, the thermal barrier coating 3 is doped with an activator. A suitable activator is, for example, terbium. The doping is mainly concentrated on a zone 32 which is located in a region of the thermal barrier coating 3 that faces the base material 2. The doped zone 32 in particular does not extend as far as the surface 5 of the thermal barrier coating 3. The terbium concentration in the doped zone comprises a few mol %, for example 1 mol %.

Trenches 34 have been introduced into the thermal barrier coating 3, extending as far as the doped zone 32 and exposing the latter in the region of the trench bases 36.

Figure 8:
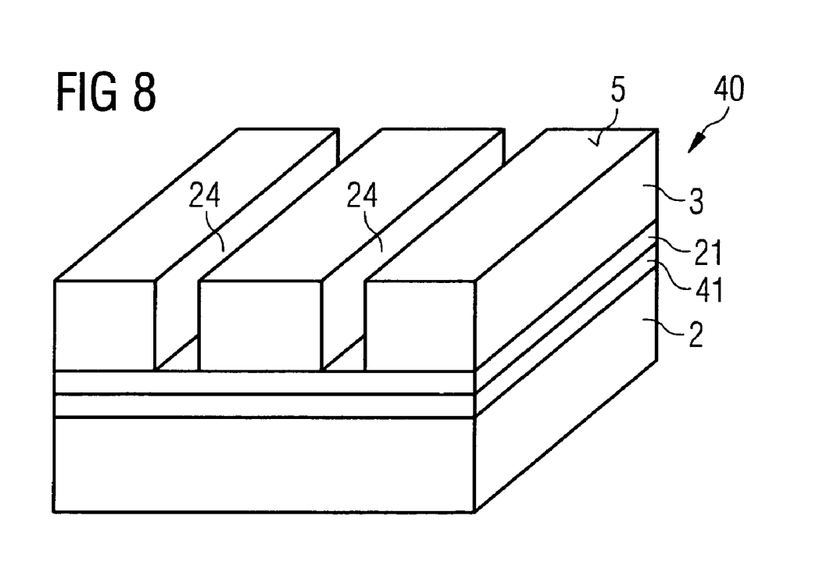
FIG. 8 shows a highly diagrammatic illustration of a fifth exemplary embodiment of a coated component according to the invention.

As a fifth exemplary embodiment of a coated component according to the invention, FIG. 8 shows a highly diagrammatic illustration of a turbine component 40. The turbine component 40 largely corresponds to the turbine component 20 from FIG. 6, the only difference being that it has a bond coat 41 (for example MCrAlX), which is arranged between the layer 21 and the base material of the turbine component

40. The bond coat 41 is formed in particular as a metallic interlayer, for example in the form of a metal alloy layer. It is used to protect the base material 2 from corrosion and/or oxidation and to increase the bonding of the layer 21 on the base material 2 of the turbine component 40. The materials properties of the thermal barrier coating 3 of the layer 21 and of the base material 2 correspond to those of the third exemplary embodiment.

A process for producing a coated component is illustrated by way of example in FIGS. 9*a* to 9*e*.

The result of this example is a coated component as described in the context of the fifth exemplary embodiment.

Figure 9A:
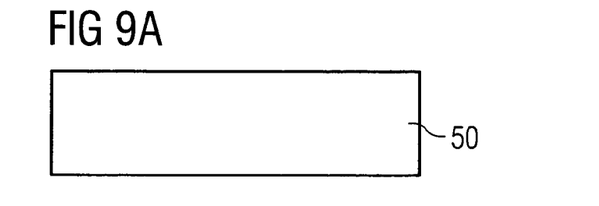
FIGS. 9a to 9e show a first process for producing a coated component according to the invention.
Figure 9B:
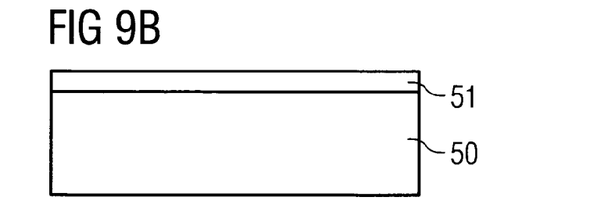
Figure 9C:
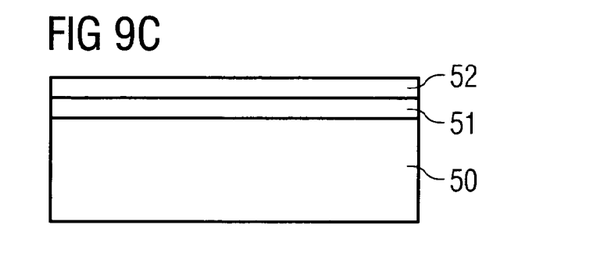

In a first step, an uncoated turbine component 50 is provided, consisting only of the base material (FIG. 9*a*). A bond coat 51 is applied to the base material of the turbine component 50 (FIG. 9*b*). Then, a metal oxide layer 52, which is mixed with an activator, is applied to the bond coat 51. Alternatively, instead of the metal oxide layer 52 it is also possible to apply a pyrochlore layer mixed with an activator (FIG. 9*c*). In both cases, the material of the metal oxide layer 52 forms the thermographic phosphor. Finally, as the last layer, a thermal barrier coating 53 is applied to the layer 52. It should be noted at this point that the layer 52 may also have thermal barrier properties.

Figure 9D:
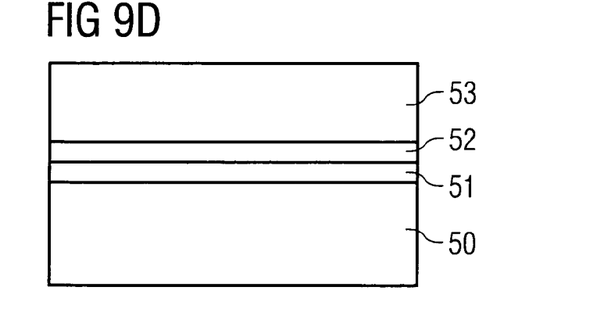
Figure 9E:
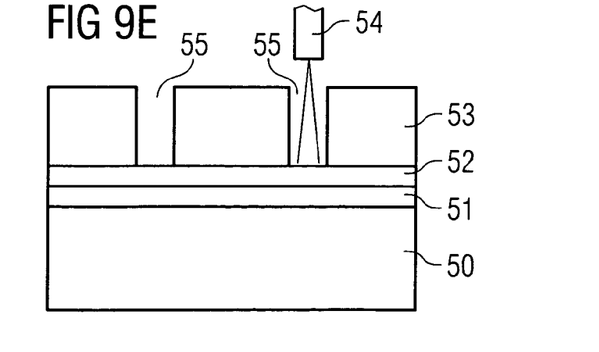

In a final working step, trenches 55 are introduced into the thermal barrier coating 53 by means of a laser 54. The depth of the trenches 55 and the width of the trenches 55 are set in such a manner by means of the laser beam that on the one hand the layer 52 is reached and on the other hand the trench geometry prevents the hot gas from directly attacking the layer 52 when the turbine component is operating in a gas turbine.

In the process according to the invention, it is also possible to dispense with the step of applying the bond coat 51 if the layer 52 is already sufficiently able to bond to the base material 50 of the turbine component. To ensure sufficient bonding, by way of example it is possible for the surface of the base material 50 to be roughened prior to the application of the layer 52.

FIGS. 10*a* to 10*d* illustrate a second exemplary embodiment of a process for producing a coated component according to the invention.

Figure 10A:
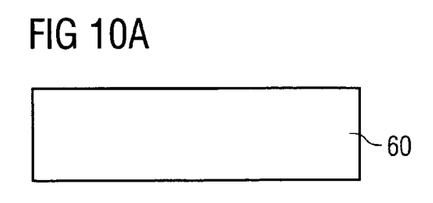
FIGS. 10a to 10d show a second process for producing a coated component according to the invention.
Figure 10B:
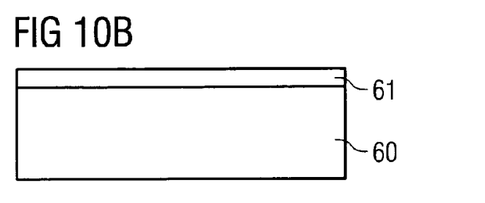
Figure 10C:
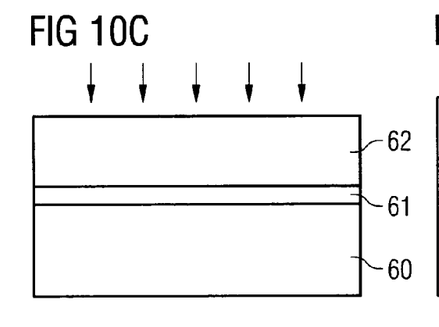
Figure 10D:
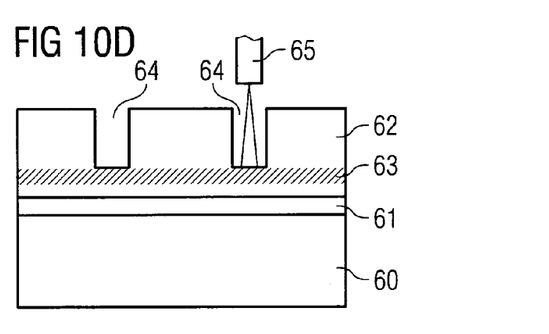

Starting from a turbine component consisting only of base material 60 (FIG. 10*a*), first of all a bond coat 61 is applied (FIG. 10*b*), followed by application of a thermal barrier coating 62 (FIG. 10*c*). After the thermal barrier coating 62 has been applied to the bond coat 61, the thermal barrier coating 62 is doped with a suitable activator which converts the material of the thermal barrier coating 62 into a thermographic phosphor in the doped region. The doping may in this case be effected by ion bombardment with suitable elements. Energy, ion flux per unit area and duration of the doping operation are in this case selected in such a way as to form a doped zone 63 in a defined depth in the thermal barrier coating 62 (FIG. 10*d*). A final process step involves introducing trenches 64 using a laser 65. The depth of the trenches is in this case set in such a way that in the region of the trench bases the doped zone 63 of the thermal barrier coating 62 is uncovered. The width and depth of the trenches are also set in such a manner that during subsequent operation of the turbine component there is no attack from hot gas in the region of the trench bases.

Figure 11:
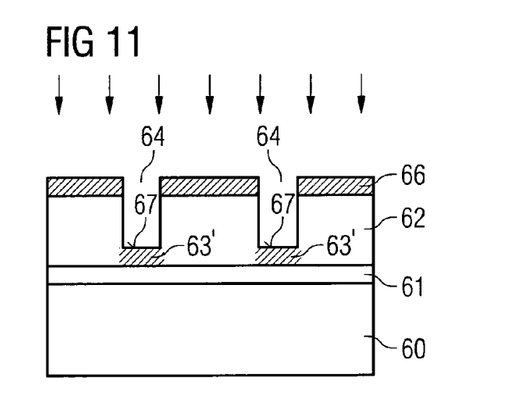
FIG. 11 shows a step of a third process for producing a coated component according to the invention.

FIG. 11 illustrates a modification of the second exemplary embodiment of a process for producing a coated component according to the invention.

Unlike in the production process illustrated with reference to FIGS. 10*a* to 10*d*, in the modification of the process, the thermal barrier coating 62 is only doped after the trenches 64 have been introduced. Moreover, prior to the introduction of the trenches 64, a mask material 66 is deposited on the thermal barrier coating 62. Therefore, prior to the doping, the trenches 64 extend both through the mask material 66 and also part way through the thermal barrier coating 62.

After the trenches 64 have been produced, doping is carried out, which can be configured analogously to the doping in the second exemplary embodiment of the production process. The mask material 66 prevents the ions from penetrating into the regions of the thermal barrier coating 62 which are covered by the mask material 66. Only in the region of the trenches 64 can the ions reach the material of the thermal barrier coating 62 and penetrate into the latter. The doped zones 63' in the thermal barrier coating 62 are therefore concentrated on the regions below the trench bases 67.

Further modifications to the production processes described are possible. For example, the first production process can be modified in such a way that the layer 52 is not produced. Instead, after the trenches have been produced, a layer of thermographic phosphor is deposited on the trench bases and fixed there, for example by being fired in.

Also, the trenches do not all have to be produced with the same depth.

Figure 12:
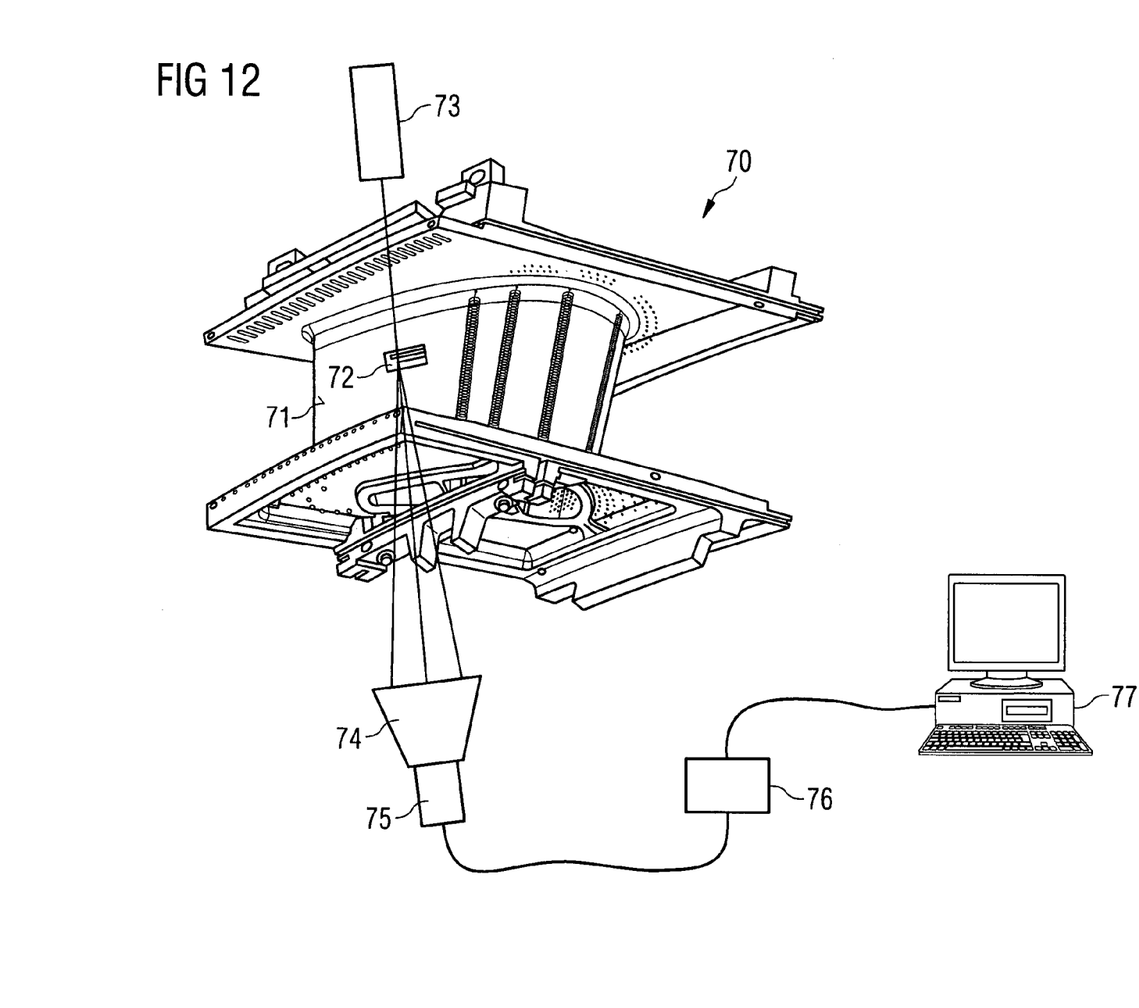
FIG. 12 shows by way of example the procedure used to measure the temperature of a thermal barrier coating on a guide vane of a gas turbine.

The procedure involved in temperature measurement will now be described with reference to FIG. 12 for the example of a guide vane 70 of a gas turbine. The gas turbine has a thermal barrier coating 71 and a portion 72 provided with trenches. A thermographic phosphor is arranged in the region of the trench bases. To measure the temperature, the thermographic phosphor is excited by means of UV radiation from a UV laser. In response to being excited by the laser radiation, the thermographic phosphor emits luminescence light, which is captured by means of a spectrometer 74 and converted into electrical signals by means of a photomultiplier 75 connected downstream. The electrical signals are output by the photomultiplier 75 to an analog/digital converter 76, which converts them into digital signals and transmits them to a PC 77. Finally, the spectrum of the luminescence light is evaluated in the PC 77.

The measurement of the temperature in the thermal barrier coating 71 is effected, for example, using the intensity ratio of two wavelengths of the emission spectrum. Alternatively, it is also possible to use a pulsed laser beam, in which case the temperature in the thermal barrier coating is determined from the decay properties of the intensity. Suitable methods for determining the temperature of a thermal barrier coating from the emission spectrum of a thermographic phosphor are described in EP 1 105 550 B1. Therefore, reference is made to the methods described therein.

If the thermal barrier coating 71 has trenches of different depths and emission wavelenghths which originate from trenches of different depths can be distinguished from one another, the method can be used to determine the temperature in regions of the thermal barrier coating 71 which are at different distances from the surface of the coating. The heat flux flowing through the thermal barrier coating 71 can then be determined from the temperature measurements at different depths of the coating.

To allow the laser beam to be introduced and to allow the emission spectrum to be discharged, the housing of the gas turbine can be provided with suitable windows.

It should be noted that arranging the trenches at suitable locations on the coated component also increases the stability of the thermal barrier coating.

The invention claimed is:

1. A coated turbine component adapted for exposure to a hot gas flow, comprising:

a component body comprising a base material;

a thermal barrier coating applied to the base material; and a thermographic phosphor arranged within or beneath the thermal barrier coating surface adapted to emit light corresponding to a temperature of the thermographic phosphor, wherein the thermal barrier coating comprises at least one recess defined by a width and a depth that is determined such that a base of the at least one recess is protected from direct exposure to the hot gas flow, and wherein the thermographic phosphor is arranged in the protected base region of the recesses.

2. The coated turbine component as claimed in claim 1, wherein the at least one recess has a different depth.

3. The coated turbine component as claimed in claim 1, wherein a thermo graphic phosphor layer is arranged within the thermal barrier coating and the base region of the recess exposes the thermographic phosphor layer to the hot gas.

4. The coated turbine component as claimed in claim 1, wherein the thermo graphic phosphor layer is activated by doping or by applying an activator, the activation occurring after the thermographic phosphor layer is arranged within, on or beneath the thermal barrier coating.

5. The coated turbine component as claimed in claim 4, wherein the doping occurs by ion implantation to form a doped layer that is exposed to the base region of the recess.

6. The coated turbine component as claimed in claim 4, wherein the activator is a rare earth element.

7. The coated turbine component as claimed in claim 6, wherein the activator is cerium, europium, dysprosium, or terbium.

8. The coated turbine component as claimed in claim 1, wherein a plurality of thermal barrier coating layers and thermographic phosphor layers are overlaid on each other, the layer closest to the hot gas flow being a thermal barrier coating.

9. The coated turbine component as claimed in claim 8, wherein, an underlying thermographic phosphor layer is partially overlaid by a thermal barrier coating layer, and a recess arranged through the layers partially exposes the thermographic phosphor layer.

10. The coated turbine component as claimed in claim 1, wherein the recess has a rectangular shape.

11. The coated turbine component as claimed in claim 1, wherein the thermographic phosphor comprises a trivalent metal oxide.

12. The coated turbine component as claimed in claim 11, wherein the metal oxide is a perovskite with the empirical formula $AA'O_3$ or a pyrochlore with the empirical formula $A_2B_2O_7$, where A and A' is a trivalent metal and B is a tetravalent metal.

13. The coated turbine component as claimed in claim 12, wherein A is a rare earth element or rhenium, and A' is lanthanum, gadolinium or samarium, or wherein A' is a rare earth element or rhenium, and A is lanthanum, gadolinium or samarium.

14. The coated turbine component as claimed in claim 1, wherein the component is a turbine blade, guide vane, heat shield, transition or combustor.

15. The coated turbine component as claimed in claim 1, wherein the thermal barrier coating is $ZrO_2$ or $Y_2O_2$—$ZrO_2$.

16. The coated turbine component as claimed in claim 1, wherein an intermediate layer is arranged between the base material and the thermal barrier coating.

\* \* \* \* \*